United States Patent Office 3,135,149
Patented June 2, 1964

3,135,149
AUTOMATIC LATHE
Guillaume-Ernest Megel and Henri Mancia, Moutier, Switzerland, assignors to Usines Tornos Fabrique de Machines Moutier S.A., Moutier, Switzerland, a joint-stock company
Filed Mar. 1, 1962, Ser. No. 176,684
Claims priority, application Switzerland Mar. 1, 1961
5 Claims. (Cl. 82—28)

This invention relates to automatic lathes and in particular to lathes of the type comprising a rotary spindle to drive a bar of stock in rotation, a first device adapted to drive said spindle at high speed, a second device adapted to drive said spindle at low speed, selectively operable clutch means adapted to connect said spindle to either one of said driving devices, and a braking device to which said spindle is at least temporarily connected when it is unclutched from the high-speed driving device.

Among the lathes of this type which are known in the art there is particularly one comprising a shiftable headstock which is adapted to machine identical pieces out of a bar of stock in a fully automatic manner. During each cycle of machining operations, the headstock drives the bar in rotation and feeds the same by shifting it lengthwise so that the front end of the bar comes into the field of tools arranged for working on the bar both in radial and in axial direction, the latter tools being, for instance, borers, screw-cutters or dies mounted on an auxiliary apparatus arranged so as to bring these axially working tools into the axis of the headstock one after the other. During the work of these tools, the spindle of the headstock is connected to the high-speed driving device. The known lathe is, moreover, arranged so as to permit still further machining operations on the work pieces such as, for instance, milling or boring operations carried out by means of tools which are driven in rotation about an axis different from that of the headstock, said additional tools being usually mounted at the place of some standard tool of the lathe.

Before the additional tools can start their working operations, the spindle has, however, to be unclutched from the high-speed driving device and then clutched to the low-speed driving device. The high and low-speed driving devices, both comprise a pulley coaxial to the spindle and driven by means of a belt. When the spindle is disconnected from the pulley driven at high speed and is connected to the low-speed pulley, the driving belt of the latter slides thereon, thus braking the spindle. The spindle, moreover, cooperates with an indexing device which stops this spindle successively in those positions in which each of the additional tools is adapted to operate. In other words, the indexing device first stops the spindle in a first position in which one of said additional operations can be carried out. After this operation, the indexing device momentarily releases the spindle which can thus rotate under the action of the low-speed driving device until it reaches the second working position. In this second position, either the same additional tool or a further one can be put into working position to carry out the second additional working operation. At the end of this operation, the indexing device can release the spindle again and then stop it in a third position and so on.

This known lathe has, however, a drawback. When the spindle is disconnected from the high-speed driving device and then connected to the low speed driving device, it does not immediately rotate at low speed; it rotates, on the contrary, at a somewhat higher speed during a time which is truly very short but which can, nevertheless, not be exactly determined. As is well known to those skilled in the art, the spindle bearings of the precision lathes are adjusted with so small a play that said bearings substantially contribute to the braking action of the low-speed pulley belt. Even under these conditions, the time required by the spindle to pass from the high to the low speed is still too long to enable a high output of the lathe. Since the time required by the spindle to pass from the high to the low speed and then to come into the first working position is a dead time, it should obviously be reduced as much as possible to increase the lathe's output. The dead time in question is exactly that which elapses after the last working operation has been carried out on the bar of stock while the same was rotating at high speed and until the first additional working operation can start on the stopped bar of stock. With lathes adapted to work at speeds of 5,000 revolutions per minute, the working operations at high speed are usually carried out in a few seconds and with lathes provided with a spindle which can be driven at speeds as high as 10,000 revolutions per minute, said working operations can obviously be carried out in an even shorter time. Now to avoid that the additional working operations cause a delay which constitutes an important part of the complete cycle of the lathe, this indexing device is to be arranged so that it can be put into operation immediately after the spindle has been clutched to the low-speed driving device. If the belt of this device is the only means provided for braking the spindle, it may occur that the indexing device will stop the spindle before the speed of the latter has been reduced to a sufficient extent. Under these circumstances, the spindle can produce so strong an impact on the stopping member of the indexing device that this stopping member could break.

Automatic lathes provided with a clutching device, comprising an intermediate position between that in which the spindle is connected to the high-speed driving device and that in which it is connected to the low-speed driving device are also already known in the art. With these known automatic lathes, a braking device is arranged so as to act on the spindle when said clutching device is in said intermediate position.

The braking devices of said known automatic lathes have, however, also the drawback of being unable to ensure a high output. Since the braking devices usually resorted to in said known lathes comprise either braking discs or a braking sleeve or barrel, the action of the braking device cannot be instantaneous. Moreover, the clutching device has to be arranged with an intermediate working position so that the passage from the high to the low speed cannot be effected without including a dead time.

Finally these known lathes have also the drawback of losing valuable time when the clutching device passes from the low to the high speed because the clutching device has to pass through the intermediate position. Moreover, the braking action produced in that intermediate position is completely useless when passing from the low to the high speed.

It is, therefore, one of the most important objects of this invention to provide a lathe of the type mentioned above so that the spindle thereof can instantaneously pass, after coming to a dead stop, without any risk of damage from the high to the low speed.

A more particular object of the invention consists in providing the lathe with a braking device comprising a fixed member, a movable member mounted for rotary motion with respect to said fixed member and arranged so that it can only rotate in the direction opposed to that in which the spindle is driven at high speed, and means arranged for instantaneously connecting said spindle to said movable member.

Still further objects of the invention will become apparent in the course of the following description.

One embodiment of the lathe according to the invention is represented diagrammatically and by way of example in the accompanying drawings which also show a modification of this embodiment.

Figure 1:
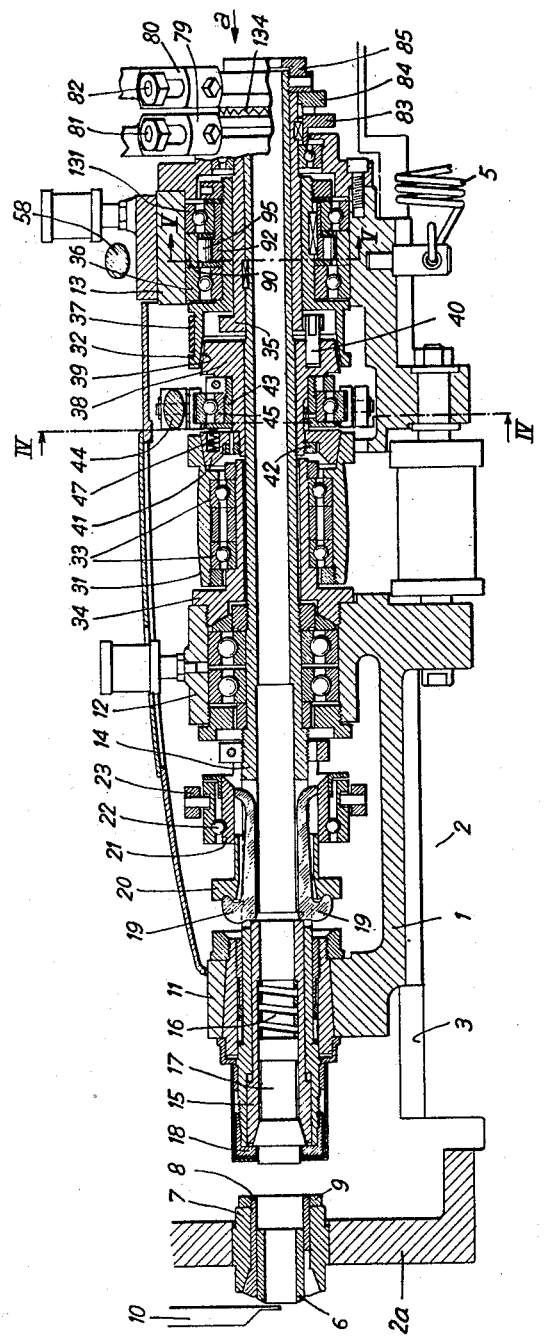
FIG. 1 is a partial axial section of this embodiment.

The lathe represented in the drawings is of the type comprising a shiftable headstock and an indexing device. The headstock 1 is mounted on the framework 2 of the lathe so that it can be shifted axially along a longitudinal slide 3 rigidly secured to the lathe's framework 2. The headstock 1 is moved along slide 3 in accordance with a predetermined scheme under the action of controlling means (not shown) comprising a cam set on a cam shaft 4 (FIG. 2) arranged for controlling all the operations of the lathe. A strong return spring 5 (FIG. 1) pulls the headstock 1 backwards and tends to keep the same in a predetermined backward position into which it pulls the headstock 1 after each operation cycle of the lathe. The headstock 1 comprises a tubular spindle 14 arranged for receiving a bar of stock. A fixed guiding sleeve 6 is mounted coaxially to spindle 14 in front thereof. Sleeve 6 is held by a second sleeve 8 provided with a plurality of longitudinal slots extending almost over the whole length of the sleeve from the front end thereof. Sleeve 8 is located in a closing ring 7, secured to a bracket 2*a* fixed to the lathe's framework 2. The sleeve 8 comprises an outer truncated conical side-face at its front end. The truncated conical face of sleeve 8 can bear against a corresponding inner face of ring 7. A nut 9 screwed on the rear portion of sleeve 8 enables adjusting the latter in axial direction with great precision as well as locking sleeve 6 in a predetermined axial position in which sleeve 6 will be exactly coaxial to spindle 14. The central opening of sleeve 6 is exactly adjusted to the diameter of the stock bar so that it will be able to guide said bar without play and to hold the same in the axis of spindle 14. Tools 10 are mounted fanwise around sleeve 6 so that the working ends of said tools extend in the immediate vicinity of the front face of sleeve 6. These radially extending tools thus enable to carry out all the lathe turning operations on the stock bar when the latter is fed through sleeve 6. Tools 10 are controlled by cams mounted on cam shaft 4.

The spindle 14 is carried by three bearings mounted in a front portion 11, a middle portion 12 and a rear portion 13 respectively of the headstock 1. Controlling means having some elements mounted on spindle 14, further elements mounted on headstock 1 and still further elements directly mounted on the lathe's framework permit to control all the operations of spindle 14.

A first device is arranged so as to grip the stock bar at the moment at which the headstock 1 is in its rearmost position and so as to release the same at the end of an operation cycle before the headstock 1 starts moving backwards under the action of its strong return spring 5. This first device is mounted on the front portion of spindle 14. It comprises an axially shiftable sleeve 15 extending within spindle 14, a spring 16, located in sleeve 15 and a chuck 17 also extending within sleeve 15 and bearing against spring 16. A cap member 18 screwed on to the front end of spindle 14 and dogs 19 rockably mounted on spindle 14 and partly extending through longitudinal slots of the latter, normally hold sleeve 15 in such a position that spring 16 is bent, thus causing the front portion of chuck 17 to grip the stock bar. The dogs 19 bear against the front face of a ring 20, encompassing spindle 14 so that they can rock and release sleeve 15 when a ring 21 axially shiftable on ring 20 and set under the controlling action of a stirrup-piece 23 is moved axially towards the front portion of headstock 1. A stirrup-piece 23 is jointed to the outer ring of a ball-bearing 22. When ring 21 is moved forward by the stirrup piece 23, the sleeve 15 can move backwards under the action of spring 16, thus allowing chuck 17 to open. The stirrup piece 23 which is swingably mounted around a vertical gudgeon 24 (FIG. 2), comprises an arm 25 carrying a follower 26. Gudgeon 24 is secured to the headstock 1 and the stirrup piece 23 is actuated by a yoke 27 rockably mounted on the lathe's framework and provided with a longitudinally extending groove 28 guiding the follower 26. Followers 29 in abutting engagement with cams 30 mounted on shaft 4 control the rocking motion of yoke 27 and accordingly that of the stirrup piece 23. It will be observed that a forward motion of the stirrup piece 23 will cause the chuck 17 to open and that a reverse motion of said stirrup piece will cause chuck 17 to close.

The rotary drive of the spindle 14 is ensured by means of a couple of pulleys 31 and 32 and of a clutching device which are all together coaxial to spindle 14 and located between the portions 12 and 13 of headstock 1. The pulley 31 is mounted on a sleeve 34 screwed into the headstock portion 12 and two ball-bearings 33 are inserted between sleeve 34 and pulley 31. A belt (not shown) always drives pulley 31 clockwise when the headstock is observed from its front end. Under the action of said belt pulley 31 rotates at a speed which permits to carry out lathe-turning operations by means of tools 10 as well as the machining operations carried out by the tools which are brought into the axis of the stock bar by the auxiliary apparatus mounted on the front portion of the lathe's framework. Since the transverse pull exerted on pulley 31 by its belt is supported by sleeve 34, it will be observed that this pull will be directly transmitted to the headstock portion 11 without affecting the spindle 14 in any way.

Figure 3:
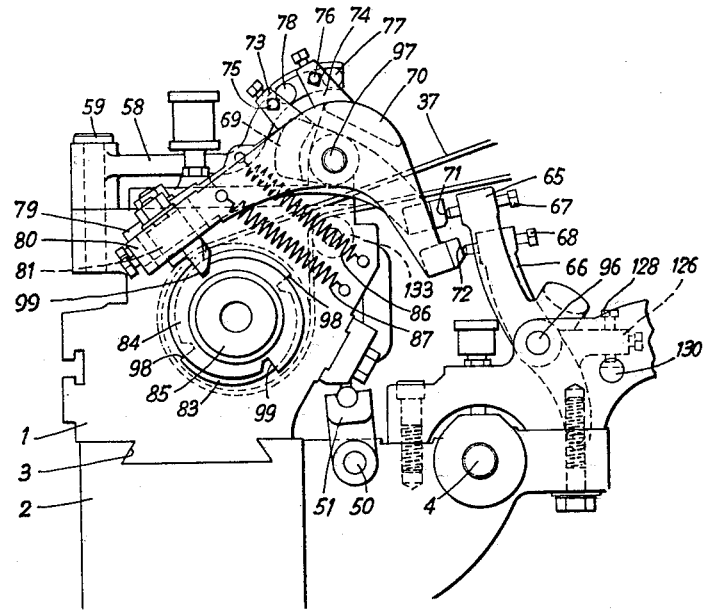
FIG. 3 is a partial elevational view in the direction of arrow *a* of FIG. 1.

The pulley 32 is provided with a tubular projection extending into the headstock portion 13. This pulley 32 is freely mounted for rotary motion on a sleeve 35 keyed on to spindle 14. A ball-bearing 36, having its outer ring set with force fit into the headstock portion 13 and its inner ring also set with force fit on the tubular projection of pulley 32, constitutes the rear bearing of the headstock. The pulley 32 is driven in rotation by means of a belt 37. The rotating speed of pulley 32 is, however, substantially lower than that of pulley 31. A quite convenient speed for pulley 32 is 200 revolutions per minute. The belt 37 surrounds the pulley 32 and passes over a roller 133 (FIG. 3). Each pulley 31, 32 can be connected to spindle 14 by means of a clutching device arranged between these pulleys. This clutching device comprises a shiftably mounted sleeve 38 provided at its rear end with a frictional truncated conical portion 39. Sleeve 38 can freely rotate around spindle 14, but it is connected to sleeve 35 by means of a finger 40 always extending in a corresponding notch of sleeve 35 whatever the axial position of sleeve 38 may be. It will be observed that the finger 40 also connects sleeve 38 to spindle 14 because sleeve 35 is itself keyed thereto. A second frictional truncated conical portion 41 carried by a separate ring is provided at the front end of sleeve 38 to which said separate ring is rigidly fixed by means of a nut 42 screwed onto sleeve 38 and secured safely in screwed position by means of pins.

When sleeve 38 moves forward, the frictional portion 41 comes in contact with a corresponding surface portion of pulley 31, thus connecting spindle 14 to said pulley by means of sleeve 38, finger 40 and sleeve 35. When sleeve 38 moves, on the contrary, in a backward direction, the frictional portion 39 engages pulley 32 and similarly connects the spindle 14 to pulley 32, the frictional portion 41 thereby being removed from pulley 31.

Figure 4:
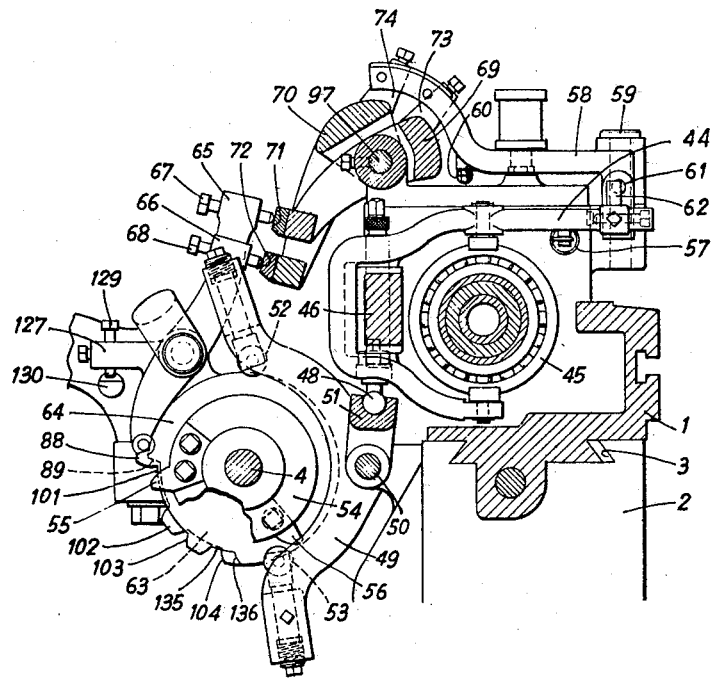
FIG. 4 is a cross-sectional view along line IV—IV of FIG. 1.

The clutching device described is controlled by a mechanism comprising first an actuating lever 44 (FIGS. 1 and 2) jointed to the outer ring of a bearing 45 having its inner ring secured by means of a nut to a sleeve 43. The latter is freely mounted on sleeve 38 with an axial play limited by the frictional portions 39 and 41. Springs 47 push, however, sleeve 43 against portion 39. Finally, the sleeves 38 and 43 are keyed to one another. The actuating lever 44 is pivotally mounted on a longitudinal rod 46 (FIG. 4) carried by the headstock 1. This lever is provided with a nose 44a (FIG. 2) parallel to the axis of the headstock and which carries a jointed follower 48. A yoke 49 rockably mounted on a longitudinal rod 50 carried by the lathe's framework (FIG. 4) is provided with a grooved projection 51 guiding the follower 48. The yoke 49 further carries two followers 52 and 53 which co-operate with a cam 54 mounted on the shaft 4. Cam 54 is provided with two ears 55 and 56. As shown in the drawings and in particular in FIGS. 2 and 4, the follower 52 causes both the yoke 49 and the lever 44 to rock in such a direction that sleeve 38 moves forward when follower 52 is lifted by ear 55. This motion occurs against the action of a return spring 57 attached by one end to the headstock 1 and by the other end to the lever 44. Detent 58, pivoted at 59 and set under the action of a spring 60, carries an adjustable stop 61 which comes to stay before another stop 62 after the afore-mentioned motion. Stop 62 is fixed at the end of one arm of lever 44. As soon as the follower 52 has passed over the crest of ear 55 and begins to descend along the following camming surface of cam 54, under the action of spring 57 which acts on the yoke 49 and causes the lever 44 to rock, this stop 62 comes in abutting engagement with stop 61, thus holding the whole clutching device in such a position that the fore frictional portion 41 is firmly held in engagement with pulley 31. In this position of the clutching means, the spindle 14 is driven at high speed. To disconnect the spindle 14 from the pulley 31 and to connect it to the pulley 32, the detent 58 needs only to be rocked through such an angle that the stop 61 carried thereby releases stop 62. The lever 44 then moves sleeve 38 backwards under the action of spring 57 and brings portion 39 into engagement with pulley 32. If portion 41 were engaged in pulley 31 with such a strength that spring 57 would not be able to pull it thereout, then the ear 56 of cam 54 would forcibly cause sleeve 38 to move in the desired direction by lifting follower 53, thus causing yoke 49 and lever 44 to rock. The frictional portion 41 would thus be disconnected from pulley 32 and the frictional portion 39 would engage pulley 31.

The headstock of the lathe described furthermore comprises an indexing device adapted so as to control the passage of the spindle 14 from the high speed level to the low speed level and to stop said spindle in a predetermined position during the time required for the first manufacturing operation which is to be carried out by one of the additional tools, and finally to cause the spindle to rotate three times one after the other through an angle of 90° thus permitting three further manufacturing operations to be carried out successively.

The indexing device is controlled by two cams 63 and 64 (FIG. 4) which are set on shaft 4 and the shape of which will be described hereinafter. Two rockers 65 and 66 (FIGS. 3 and 4) are pivoted on a common shaft 96 carried by the lathe's framework and each is actuated by one of the cams 63 and 64. Each rocker is, moreover, provided with an arm 126, 127 perpendicular to the axis of spindle 14. Each arm 126, 127 carries an adjustable vertical screw 128, 129 at its free end. A stop bar 130 fixed to the lathe's framework extends below the screws 128, 129. The rockers 65 and 66 are provided with screws 67, 68 respectively by means of which each of them can actuate either one of two rocking bars 69, 70 about a shaft 97 carried by the headstock 1 and extending above the grooved projection 51. Each rocking bar 69, 70 is provided on the one hand with a plane bearing surface 71, 72 and, on the other hand, with a projection 73, 74 each carrying an adjustable screw 75, 76. The screws 67, 68 co-operate with the surfaces 71, 72 to control the rocking motion of bars 69, 70. The adjustable screws 75, 76 are engaged into projections 73, 74 from the side thereof and they are set in such a position that their ends can come into abutting engagement with plugs 77, 78, each having an inclined end surface, said plugs being fixed to detent 58. By pivoting about shaft 97, each bar 69, 70 can bring the screw 75, 76 associated thereto into abutting engagement with the inclined end surface of the corresponding plug 77, 78, thus causing the detent 58 to rock and the stop 61 of the latter to release stop 62. When the lever 44 rocks counterclockwise in FIG. 2 under the action of spring 57, the stop 62 carried thereby moves at the side of stop 61. As long as the lever 44 remains in the low-speed position, the spring 60 acting on detent 58 holds the stop 61 thereof against the side surface of stop 62. Each one of the bars 69, 70 is finally provided with an arm 79, 80 (FIGS. 2 and 3) extending above the rear portion of spindle 14. These arms carry a latch member 81, 82 at their ends. Each member 81, 82 is located in an elongated slot provided at the end of the corresponding arm so that the latch members can be adjusted both in transverse and in longitudinal direction. The members 81 and 82 co-operate with indexing discs 83, 84 by means of triangular noses provided at their lower ends. Whereas the fore disc 83 is keyed on to the rear end portion of sleeve 35 (FIG. 1), the rear disc 84 is freely mounted on said rear end portion and is gripped by a nut 85 screwed on to spindle 14. Each disc 83, 84 is provided with a toothed portion 134 on one of its side faces so that the disc 84 can be adjusted at will with respect to disc 83 and then latched in the adjusted position when nut 85 is screwed down, thus causing the toothed portions 134 to engage one another. Each disc 83, 84 is further provided with two diametrically opposed notches 98, 99 at its periphery. The notches 98, 99 have a triangular shape corresponding to that of the lower portions of the latch members 81, 82. One edge of each of said notches extends in a radial direction and is adapted so as to come into abutting engagement with a corresponding portion of the latch members 81, 82.

In the particular embodiment represented in the drawings, the disc 84 is adjusted with respect to disc 83 so that its notches 99 are located on a diameter perpendicular to that on which notches 98 lie. Springs 86 and 87 are attached to the rocking bars 69 and 70 to pull the same in such a direction that the latch members 81 and 82 tend to bear against the periphery of the indexing discs 83 and 84.

As long as the spindle 14 is driven at high speed, the latch members 81, 82 are prevented from coming in contact with the indexing discs 83, 84 by cylindrical surface portions which are provided on the cams 63 and 64 and which lift the followers of rockers 65 and 66 so as to hold these rockers as well as the rocking bars 69, 70 in intermediate positions in which the screws 75, 76 do not yet come in contact with the plugs 77, 78.

To ensure the passage of the spindle 14 from the high speed to the low speed level, the cam 64 is provided with a low ear 88 which causes the rocker 66 and, consequently, the rocking bar 70 to rock until the screw 75 comes in contact with plug 77, thus initiating the releasing motion of stop 61 and the rocking motion of lever 44 as already explained above. At that moment, a descending camming surface 89 of cam 63 extends below the follower of rocker 65 so that this rocker and the rocking bar 69 associated thereto may rock until the latch member 81 comes in contact with the periphery of disc 83. As soon as one of the notches 98 passes under the latch member 81, the latter enters said notch under the action of spring 86, thus stopping the spindle 14.

When the lathe described is used to machine workpieces which do not require any additional machining operation necessitating stopping the headstock spindle, the rockers 65, 66 can easily be put out of action. Therefore, the screws 128 and 129 need only to be screwed down completely. These screws then come in contact with the stop bar 130 and hold the rockers 65 and 66 as well as the rocking bars 69 and 70 in such positions that the latch members 81 and 82 cannot reach the discs 83 and 84. The cams 63 and 64 can also be removed.

It follows from the above-mentioned explanations that between the moment at which the spindle 14 is disconnected from the pulley 31 and the moment at which the latch member 81 enters one of the notches 98, the spindle 14 has to pass from the speed at which it ran for the last turning operation to the speed imparted to it by pulley 32, the latter speed being chosen low enough to avoid any damage when the radial edge of one of the notches 98 butts against the latch member 81. Moreover, the dead time elapsing between the two above-mentioned moments should be reduced as much as possible because this dead time only causes a fully useless extension of the time required for a complete operational cycle. To reduce said dead time as much as possible, the lathe headstock comprises, according to the invention, a braking device capable of stopping the spindle 14 instantaneously.

Figure 2:
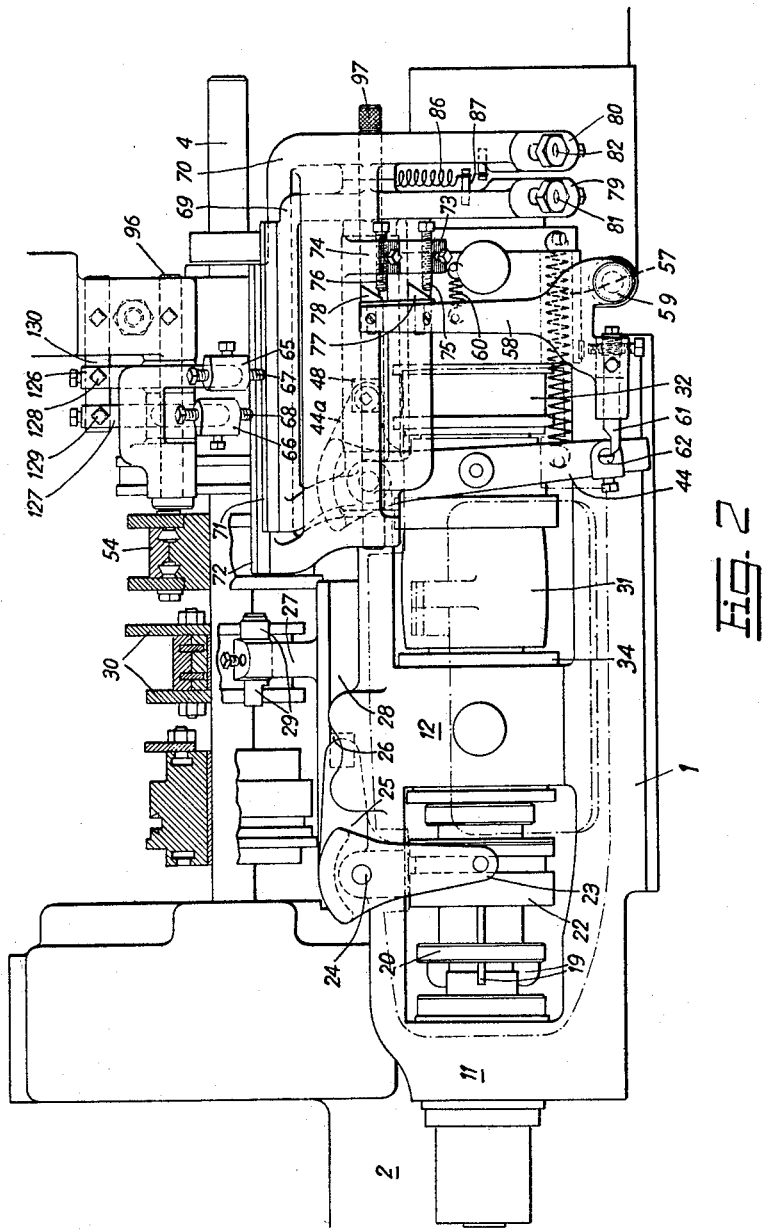
FIG. 2 is a partial plan view thereof.
Figure 5:
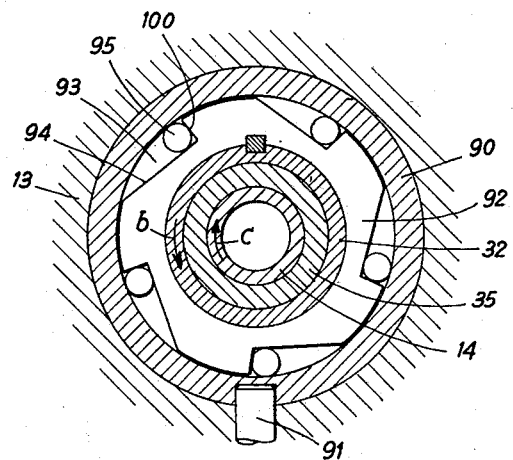
FIG. 5 is a partial cross-sectional view along line V—V of FIG. 1.

The instantaneous braking device now described with reference to FIGS. 1 and 5 is located in the headstock portion 13. It comprises a ring 90 set with force fit into the opening of portion 13. This ring 90 is prevented from any rotary motion by means of a pin 91 extending in a radial direction. A disc 92, keyed on to the tubular projection of pulley 32, is located in ring 90. The disc 92, thus rotates with pulley 32 in the direction in which the latter is driven by belt 37. The disc 92 is also provided with a tubular projection which surrounds that of the pulley 32. The inner race of a ball-bearing 131 is set with force fit on to the tubular projection of disc 92. The outer race of bearing 131 engages the headstock portion 13 and is, accordingly, fixed. Regularly spaced and identical cut-outs 93 are provided at the periphery of disc 92. Each of these cut-outs comprises a radial edge 100 and an inclined straight edge 94. A wedging member constituted by a roller 95 is freely set into each one of the cut-outs 93. The diameter of rollers 95 is chosen with respect to the depth of the cut-outs 93 in such a way that these rollers will constitute the braking members of the device described.

In the usual running position, the rollers 95 remain in contact with the radial face 100 of the cut-outs 93. In that position, the rollers 95 can slide without substantial friction on the inner surface of ring 90 provided that disc 92 rotate in the direction of arrow $b$. If disc 92 is, on the contrary, driven into the direction of arrow $c$, the frictional action exerted on each roller 95 tends to cause the same to roll along the inclined straight edge 94. The rollers 95 can, however, not move far away from the radial edges 100; they immediately come into a clamped position between the inner surface of ring 90 and the inclined edges 94. As is well-known to those skilled in the art, the locking action ensured by rollers 95 is extremely quick and useful.

As already stated above, the pulley 31 rotates clockwise when observing the headstock from its front portion. In other words, the spindle 14 rotates in the direction of arrow $c$ (FIG. 5) when it is on the high-speed level. The belt 37 moves in the opposed direction and thus drives pulley 32 counter-clockwise (arrow $b$, FIG. 5). Since the disc 92 is keyed on to pulley 32, it also rotates in the direction of arrow $b$. It will be observed that when the lever 44 pushes the frictional portion 39 into engagement with pulley 32, after having removed the frictional portion 41 from pulley 31, the spindle 14 is still rotating clockwise at a high speed because of its inertia. The pulley 32 thus firstly tends to rotate in the same direction as spindle 14 while sliding under belt 37. The pulley 32, is however, absolutely prevented from rotating in said direction because of the rollers 95 which immediately come into wedging position and lock disc 92 and consequently also pulley 32 and spindle 14. After these members have been stopped, the belt 37 immediately starts driving pulley 32 and spindle 14 counter-clockwise.

During a complete cycle, the lathe headstock described above functions as follows:

The cycle begins when the headstock 1 is in its rearmost position in which it has been pulled by spring 5. The ring 21 is still in its foremost position so that the chuck 17 is open. Moreover, the sliding sleeve 38 is held in its forward position against the action of spring 57 by means of detent 58, so that the spindle 14 is connected to pulley 31 and rotates at high speed in the direction of arrow $c$ (FIG. 5). The latch members 81 and 82 are removed from the indexing discs 83 and 84.

One of the cams 30 then moves ring 21 backwards and, accordingly, causes chuck 17 to grip the bar of stock extending through spindle 14 and having its front end in the immediate vicinity of the forward opening of guiding sleeve 6. Immediately after the stock bar has been gripped, the headstock 1 is urged forward and the usual lathe-turning operations are carried out.

At a predetermined moment of the cycle, which depends on the shape of the work pieces to be manufactured, the ear 88 of cam 64 lifts rocker 66 and causes rocking bar 70 to move about its shaft until screw 75 unlocks detent 58. The lever 44 then disconnects spindle 14 from pulley 31 and briskly connects it to pulley 32. The instantaneous braking device immediately stops spindle 14, after which belt 37 drives pulley 32 at low speed in the direction of arrow $b$. During the stopping action of spindle 14, the camming surface 89 of cam 63 extends under the rocker 65. This camming surface can then cause rocker 65 to rotate about shaft 96 and actuate bar 69 until the latch member 81 drops on disc 83. As soon as the latch member 81 enters one of both notches 98, it stops spindle 14 in a very precise position so that the first additional machining operation can be carried out by means of a tool either set in an eccentric position with regard to the work piece or adapted to move across the work piece, for instance for providing a bore or machining the same. During that first additional machining operation, a cut-out portion 101 of cam 64 provided behind ear 88 comes under the rocker 66 so that the latter causes latch member 82 to come in contact with disc 84. At the end of the first additional machining operation, an ear 102 of cam 63 lifts rocker 65 and removes accordingly the latch member 81 from disc 83. The belt 37, which slid over pulley 32, now drives the same until the latch member 82 enters the first notch 99 of the disc 84 which follows the notch 98 which has previously been engaged by latch member 81 (position represented in FIG. 3). The spindle 14 is thus stopped again in a new position around its axis. It will be observed that, due to the particular arrangement of notches 98 and 99, the spindle 14 rotates through an angle of 90° when passing from the first stopped position to the second one. As soon as the spindle has been stopped in this second position, the corresponding additional manufacturing operation can be carried out. During that second manufacturing operation, the rocker 65 is released by ear 102 of cam 63 and it permits latch member 81 to come in contact with disc 83 again, so that this latch member will be ready to stop the spindle 14 in a third position. At the end of the second machining operation, an ear 103 of cam 64 lifts rocker 66 and accordingly causes spindle 14 to be released. This spindle will thus rotate further through an angle of 90° and accordingly reach its third stopped position.

During that third machining operation, the ear 103 moves beyond rocker 66 which thus drops into a recessed portion 135 of the corresponding cam, thus causing the latch member 82 to come in contact with disc 84 again. Camming surface 104 of cam 63 causes the latch member 81 to be moved in releasing position at the end of the third additional machining operation.

The spindle 14 thus rotates a further step forward to an angle of 90° until it will be stopped by the latch member 82 in the third working position. At the end of the machining operation carried out in the latter position, camming surface 136 of cam 64 causes the spindle 14 to be released.

The camming surfaces 136 and 104, the ear 88 and the descending surface 89 define cylindrical portions on both cams 63 and 64, which cylindrical surfaces hold both latch members 81 and 82 in an inoperative position during the remaining portion of the lathe cycle. It will indeed be observed that the rockers 65 and 66 remain on the cylindrical portion of the corresponding cam as soon as the fourth additional machining operation has been carried out so that the latch members 81 and 82 will be removed from the indexing discs 83 and 84. The spindle 14 then rotates at low speed under the driving action of belt 37. At this moment, the ear 55 of cam 54, however, actuates the rocker 49 and accordingly causes spindle 14 to be disconnected from pulley 32 and to be connected to pulley 31 again. The spindle 14 is accordingly driven at high speed again so that one or more machining operations comprising the severing operation of the work piece from the stock bar can still be carried out at the lathe turning speed. After the severing operation, the cam 30 opens the chuck 17 and the headstock is permitted to move backwards under the action of spring 5, thus ending the lathe cycle which has just been considered.

It will be observed that the indexing discs 83 and 84 represented in FIG. 3 only permit the control of an even number of additional machining operations which are, moreover, to be carried out on a circular bar of stock in directions symmetrically arranged around the stock bar axis. The shape of cams 63 and 64 (FIG. 4) and that of discs 83 and 84 indeed requires the latch members 81 and 82 (FIGS. 2 and 3) to come alternately in working position since the ears provided on the cams to cause the latch members to be released, have to be made with a sufficient width, one and the same latch member cannot possibly be brought into releasing position and permitted to come in contact with its indexing disc immediately afterwards. When one latch member is brought into releasing position, it is, therefore, the other latch member which has to be ready to stop the spindle and accordingly to be in contact with the smooth periphery of its indexing disc. If the number of the additional machining operations is uneven, or if the axes in which these additional manufacturing operations have to be carried out are not symmetrically arranged round the stock bar axis, or even if said additional manufacturing operations have to be carried out in a predetermined sequence, the latch member which stops the headstock for the first machining operation has to do it by entering a predetermining notch of one of the indexing discs. To achieve this result, the disc which co-operates with said latch member has to be provided with only one notch while the other notches are provided on the second indexing disc.

Figure 6:
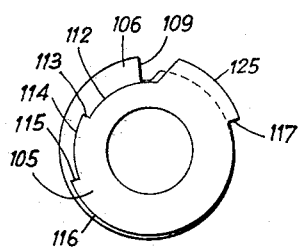
FIG. 6 is an elevational view of a control member belonging to said modification.
Figure 7:
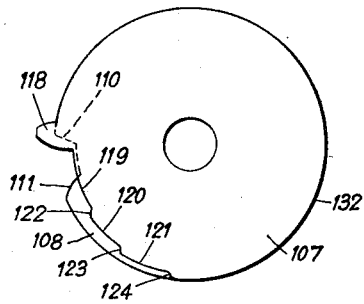
FIG. 7 is an elevational view of another control member of said modification.

Indexing discs 105, 106 and cams 197, 108 can, therefore, be used instead of discs 83, 84 and cams 63, 64, as shown in the modification represented in FIGS. 6 and 7. The disc 106 has an outer periphery cut along a spiral, the two ends of which are separated from one another by an indentation 109, having a radially extending face directed inwards from the spiral end which is farthest removed from the cam center. The disc 106 is that which co-operates with the latch member controlled by cam 108. This cam has a circular periphery provided with only one indentation 110 which comes under the corresponding rocker at the moment at which the passage of the spindle 14 from the high to the low speed level has been controlled. The side edge 111 of indentation 110 serves to lift the latch member associated to disc 106 out of the indentation 109 at the moment at which the first additional working operation has ended. The disc 105 comprises four portions 112, 114, 116 and 125, each having the form of an arc of circle and the radii of which progressively increase in size. These circular portions of the periphery of disc 105 are separated from each other by radially extending abutting faces 113, 115 and 117. Whereas the radially extending face of indentation 108 exactly positions the first stopping of spindle 14 in which the first additional operation has to be carried out, the abutting faces 113, 115 and 117 are set apart from face 109 through distances which correspond to the positions of the axes along which the further additional operations have to be carried out.

The cam 107 controls the latch member associated to disc 105 and is provided, therefore, like cam 64 with an ear 118 arranged for causing the spindle 14 to pass on the low speed level. Cam 107 is orientated with regard to cam 108 in such a manner that the indentation 110 will only come under the corresponding rocker after ear 118 will have caused the spindle 14 to pass on the low speed level. Cam 107, further, comprises four successive portions 119, 120, 121 and 132 at its periphery, each of these portions having the form of an arc of circle and the radii of these portions progressively increasing in size. Portions 119, 120, 121 and 132 are separated from each other by ascending camming surfaces 122, 123 and 124. The last circular portion 132 extends from the camming surface 124 to the ear 118 and thus forms the cylindrical portion of cam 107 which holds the corresponding latch member in operative condition when spindle 14 is rotating at high speed. When the rocker associated to cam 107 follows the portion 119 thereof it holds the latch member associated to disc 105 on the level of the portion 112 of this disc, so that the abutting face 113 will engage said latch member and accordingly stop the spindle 14 in the position corresponding to the second additional manufacturing operation at the moment at which the first additional operation will have ended. At the end of the second additional manufacturing operation, the camming surface 122 lifts said rocker until the corresponding latch member comes on to the level of portion 114. The disc 105 and the spindle 14 will accordingly rotate until the abutting face 115 will engage the latch member. The spindle 14 will then be released from this third resting position and be caused to pass to the fourth one and be released again therefrom in a manner similar to that described above with regard to the first and the second resting positions.

Since the first resting position of spindle 14 is always controlled by indexing disc 106, which comprises only one indentation, the first resting position of the spindle will always have the same orientation with regard to the spindle axis. The further resting positions of the spindle will also always have the same orientation with respect to the first resting position, said further positions depending on the locations chosen for the abutting faces 113, 115 and 117.

With a non-circular bar of stock, the directions in which the additional manufacturing operations have to be carried out often not only have to lie in predetermined positions with regard to one another, but must also have predetermined positions with regard to the shape of the stock bar. To machine non-circular stock bars, the spindle is usually provided with a chuck having a central opening with a shape similar to that of the stock bar to be machined. With such a chuck, the spindle may be moved backwards at the end of the machining cycle i.e. when the chuck is open, without driving the stock bar backwards, but while still driving it in rotation so that the relative positions of the bar and of the spindle will always remain the same from the first work piece machined out of the bar until the latter is exhausted.

It will be appreciated that the modification described enables the carrying out of as many additional manufacturing operations as desired. In practice, this number will, however, rarely exceed four.

The most important advantage of the lathe described is to permit a noticeable reduction of the manufacturing cycle, in particular when several additional manufacturing operations have to be carried out while the stock bar is stopped. Even with spindles rotating at speeds higher than 10,000 revolutions per minute, the braking device device described enables passing instantaneously from the high to the low speed. Moreover, it will be observed that the parts of the lathe will not be exposed to any damage due to the impact since the braking device is the only part which absorbs the whole amount of rotational energy of the spindle without transmitting said energy to another part or causing the spindle to rebound and, accordingly, to accomplish a rotation in the direction opposed to that of the high speed rotation, as this would occur if a radial projection of the spindle were caused to butt against a fixed stop. Due to the fact that the low speed pulley 32 rotates in the opposed direction with regard to pulley 31, the braking device can be designed in a most simple and uncumbersome manner. It will, moreover, be observed that a setting error causing, for instance, one of the latches 81, 82 to bear on the corresponding indexing disc 83, 84 before the spindle 14 has been stopped, will not involve any risk of damage because any impact is excluded. Since the spindle rotates at high speed in such a direction that the latches can only come in contact with the inclined faces of the indentations provided in the indexing discs, these latches would be thrust out of the path of the discs if they happened to come too early in contact therewith.

In a further not represented modification, the sliding action of the belt 37 on pulley 32 could be avoided by providing the driving means of said belt with a sliding mechanism becoming operative as soon as the load on pulley 32 exceeds a predetermined amount. In this modification, the belt 37 would be stopped at at the same time as pulley 32 during the additional manufacturing operations.

In a further modification, also not represented, the cam controlling the lever 44 could be given such a shape that the shiftable sleeve 3 would be held in an intermediate position when the spindle is at rest, thus disconnecting the latter from pulley 31 as well as from pulley 32.

Still further modifications of the lathe according to the invention, as well as of the shape, sizes and arrangement of parts of this lathe will appear obvious to those skilled in the art within the scope of the appended claims without departing from the spirit of the invention or sacrificing the advantages thereof.

We claim:

1. An automatic lathe comprising, in combination, a rotary spindle adapted for driving a bar of stock in rotation, a first device adapted to drive said spindle at high speed, a second device adapted to drive said spindle at low speed, selectively operable clutch means adapted to connect said spindle to either one of said driving devices, a braking device to which said spindle is at least temporarily connected when it is unclutched from the high speed driving device, said braking device comprising a fixed member, a moveable member mounted for rotary motion with respect to said fixed member and arranged so that it can only rotate in the direction opposed to that in which the spindle is driven at high speed, and means arranged for instantaneously connecting said spindle to said moveable member.

2. An automatic lathe according to claim 1, said second device rotating in a direction opposed to that of said first device and comprising an element fixed to the moveable member of said braking device, and said selectively operable clutch means constituting said means arranged for instantaneously connecting said spindle to said moveable member.

3. An automatic lathe according to claim 2, said first driving device and said second driving device comprising, respectively, a belt-driven pulley, the pulley of the device adapted to drive the spindle at low speed being provided with a tubular extension coaxial to said spindle and constituting the moveable member of said braking device.

4. An automatic lathe according to claim 2, said braking device further comprising a lodging partly surrounded by a cylindrical surface portion provided on one of said members of said braking device and partly by a surface portion provided on the other one of said members, and wedging means located with play in said lodging and adapted for engaging said surface portions of said members of said braking device to immobilize said moveable member.

5. An automatic lathe according to claim 4, said wedging means consisting of a plurality of circular members, each located in a lodging surrounded by surface portions belonging in part to the moveable member of said braking device and in part to said fixed member of said braking device, the lodgings of said circular members thereby being regularly staggered around the axis of said spindle.

References Cited in the file of this patent
UNITED STATES PATENTS

| | | |
|---|---|---|
| 2,174,292 | Rich | Sept. 26, 1939 |
| 2,408,658 | Kurzweil | Oct. 1, 1946 |